US009092062B2

(12) United States Patent
Park et al.

(10) Patent No.: US 9,092,062 B2
(45) Date of Patent: Jul. 28, 2015

(54) USER CUSTOMIZABLE INTERFACE SYSTEM AND IMPLEMENTING METHOD THEREOF

(71) Applicant: KOREA INSTITUTE OF SCIENCE AND TECHNOLOGY, Seoul (KR)

(72) Inventors: Myoung Soo Park, Seoul (KR); Jung-Min Park, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 8 days.

(21) Appl. No.: 13/781,914

(22) Filed: Mar. 1, 2013

(65) Prior Publication Data

US 2014/0007020 A1 Jan. 2, 2014

(30) Foreign Application Priority Data

Jun. 29, 2012 (KR) .......................... 10-2012-0070929

(51) Int. Cl.
G06F 3/0488 (2013.01)
G06F 3/01 (2006.01)
G06F 3/0481 (2013.01)
G06F 3/03 (2006.01)

(52) U.S. Cl.
CPC ................ *G06F 3/017* (2013.01); *G06F 3/011* (2013.01); *G06F 3/016* (2013.01); *G06F 3/0304* (2013.01); *G06F 3/0481* (2013.01); *G06F 3/0488* (2013.01)

(58) Field of Classification Search
USPC ........................... 715/863, 702; 345/156, 173
See application file for complete search history.

(56) References Cited

U.S. PATENT DOCUMENTS

| 5,754,939 | A | * | 5/1998 | Herz et al. | 455/3.04 |
|---|---|---|---|---|---|
| 8,612,894 | B2 | * | 12/2013 | Kim | 715/863 |
| 2002/0196268 | A1 | * | 12/2002 | Wolff et al. | 345/718 |
| 2003/0007018 | A1 | * | 1/2003 | Seni et al. | 345/864 |
| 2004/0070573 | A1 | * | 4/2004 | Graham | 345/179 |
| 2007/0075915 | A1 | * | 4/2007 | Cheon et al. | 345/1.1 |
| 2007/0075978 | A1 | * | 4/2007 | Chung | 345/173 |
| 2007/0203589 | A1 | * | 8/2007 | Flinn et al. | 700/29 |
| 2008/0178126 | A1 | * | 7/2008 | Beeck et al. | 715/863 |
| 2008/0200153 | A1 | * | 8/2008 | Fitzpatrick et al. | 455/414.1 |
| 2009/0109183 | A1 | * | 4/2009 | Carvajal et al. | 345/173 |
| 2009/0265627 | A1 | * | 10/2009 | Kim et al. | 715/702 |
| 2009/0276377 | A1 | * | 11/2009 | Dutta et al. | 706/12 |
| 2010/0031203 | A1 | * | 2/2010 | Morris et al. | 715/863 |
| 2010/0058252 | A1 | * | 3/2010 | Ko | 715/863 |
| 2010/0229125 | A1 | * | 9/2010 | Cha | 715/828 |
| 2010/0257447 | A1 | * | 10/2010 | Kim et al. | 715/702 |
| 2010/0306718 | A1 | * | 12/2010 | Shim et al. | 715/863 |

(Continued)

FOREIGN PATENT DOCUMENTS

| KR | 10-2010-0055945 A | 5/2010 |
|---|---|---|
| KR | 10-0993459 | 11/2010 |
| KR | 10-2010-0133621 A | 12/2010 |

*Primary Examiner* — Phenuel Salomon
(74) *Attorney, Agent, or Firm* — NSIP Law (57) ABSTRACT

A user interface system has an input device for collecting gesture inputs of a user, a computing device for processing the gesture inputs collected by the input device, a memory for storing a set of executive gestures for executing various functions, and an output device for displaying information processed by the computing device, wherein each executive gesture is defined as an executive input for each function, so that, when a gesture input performed by the user corresponds to an executive gesture, a function corresponding thereto is executed, and wherein the executive gestures are capable of being changed and stored by the user.

15 Claims, 9 Drawing Sheets

(56) References Cited

U.S. PATENT DOCUMENTS

| | | | |
|---|---|---|---|
| 2011/0314427 A1* | 12/2011 | Sundararajan | 715/863 |
| 2012/0124456 A1* | 5/2012 | Perez et al. | 715/200 |
| 2012/0124516 A1* | 5/2012 | Friedman | 715/810 |
| 2012/0131136 A1* | 5/2012 | Kelley et al. | 709/217 |
| 2012/0260173 A1* | 10/2012 | Friedlander et al. | 715/720 |
| 2013/0074014 A1* | 3/2013 | Ouyang et al. | 715/863 |
| 2013/0179781 A1* | 7/2013 | Nan et al. | 715/711 |
| 2013/0227418 A1* | 8/2013 | Sa et al. | 715/728 |

* cited by examiner

USER CUSTOMIZABLE INTERFACE SYSTEM AND IMPLEMENTING METHOD THEREOF

CROSS-REFERENCE TO RELATED APPLICATION

This application claims priority to Korean Patent Application No. 10-2012-0070929, filed on Jun. 29, 2012, and all the benefits accruing therefrom under 35 U.S.C. §119, the contents of which in its entirety are herein incorporated by reference.

BACKGROUND

1. Field

The present disclosure relates to a user interface system and an implementing method thereof, and more particularly, to a user interface system and an implementing method thereof, which allow a user to directly change gestures for executing various functions and further recommend gestures to the user.

2. Description of the Related Art

As portable electronic computer devices such as smart phones as well as general computers come into wide use, functions provided by such devices are being diversified. Due to such diversified functions, inputs for performing such functions also need to be more diversified.

For diversifying inputs, a touch screen is recently used as a user interface, so that a user inputs an input for executing a function by directly touching the touch screen and performing a predetermined gesture.

As an exemplary conventional technique of an input method, a moving body which may be touched and moved by a user is graphically displayed on a screen along with a path representing a direction along which the moving body should be moved. For example, if the user moves the moving body along the displayed path, the electronic device is unlocked.

However, in the above conventional technique, a gesture for executing a function is very simple and limited, and so it is difficult to execute various functions by using various gestures.

Electronic devices are expected to be developed to perform more functions. Therefore, it is needed to suggest an input method capable of executing more diversified functions to catch up with this trend.

SUMMARY

The present disclosure is directed to providing a user interface system and an implementing method thereof, which may change inputs for executing a function in various ways according to the taste of the user but decrease a burden on the user to designate a new executive input by recommending candidates of new executive inputs.

In one aspect, there is provided a user interface system, which includes: an input device for collecting gesture inputs of a user; a computing device for processing the gesture inputs collected by the input device; a memory for storing a set of executive gestures for executing various functions; and an output device for displaying information processed by the computing device, wherein each executive gesture is defined as an executive input for each function, so that, when the gesture input performed by the user corresponds to an executive gesture, a function corresponding thereto is executed, and wherein the executive gestures are capable of being changed and stored by the user.

According to an embodiment, a function may be suggested to the user and selected by the user, and then the executive gesture for the selected function may be changed and stored.

In addition, a new executive gesture for executing the selected function may be provided by a direct demonstration of user.

In addition, a new executive gesture for executing the selected function may be generated and recommended to the user.

In this case, the new executive gesture may be generated by using executive gestures for executing functions similar to the selected function, and the new executive gesture may be generated in consideration of the similarities with the other executive gestures.

In another aspect of the present disclosure, there is provided a user interface implementing method, which includes: determining whether an executive gesture change request of the user is present; suggesting a selectable function to the user when the request for changing the executive gesture request is present; and changing and storing an executive gesture for executing a function selected by the user.

According to an embodiment, the user interface implementing method may further include inquiring the user whether or not to desire a recommendation of an available executive gesture, after a function is selected by the user.

In addition, the user interface implementing method may further include giving an opportunity for the user to directly input an executive gesture for the selected function, when a recommendation rejecting input for the available executive gesture is input.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Hereinafter, an embodiment of the present disclosure will be described with reference to the accompanying drawings. Though the present disclosure is described with reference to the embodiments depicted in the drawings, the embodiments are just examples, and the spirit of the present disclosure and its essential configurations and operations are not limited thereto.

Figure 1:
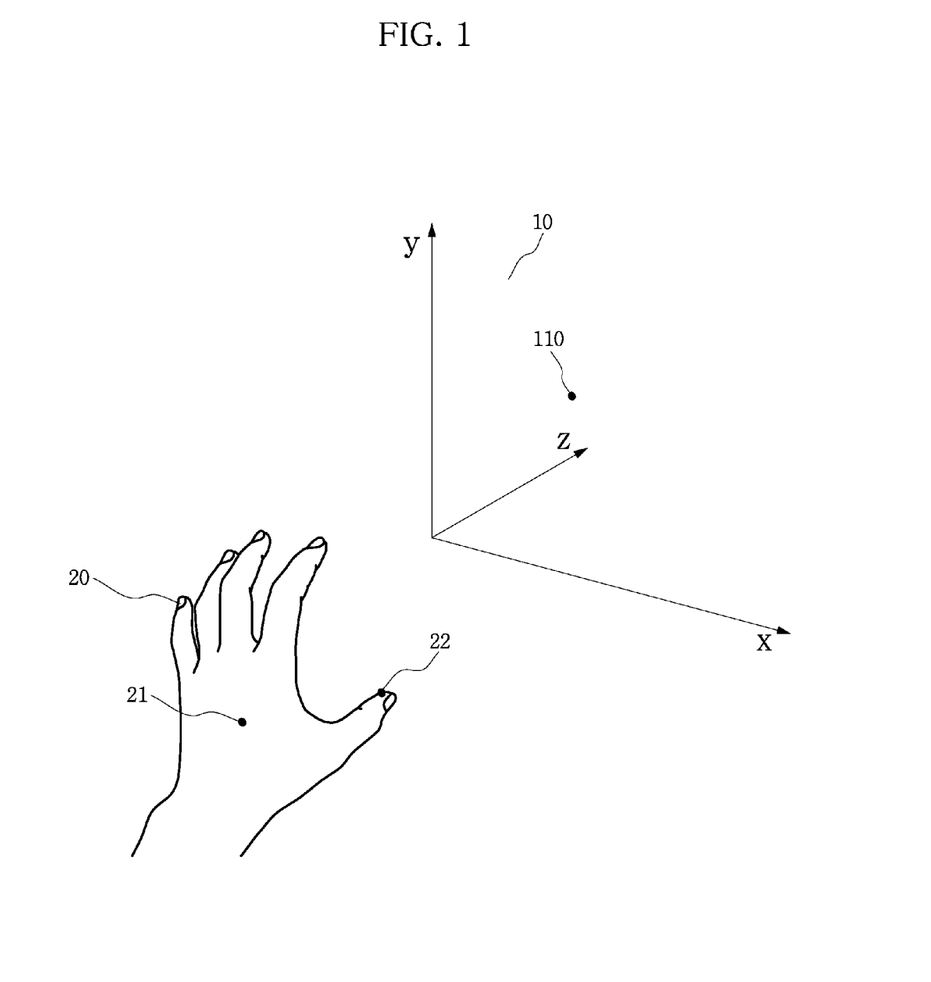
FIGS. 1 and 2 are diagrams showing a 3-dimensional user interface system according to an embodiment of the present disclosure.
Figure 2:
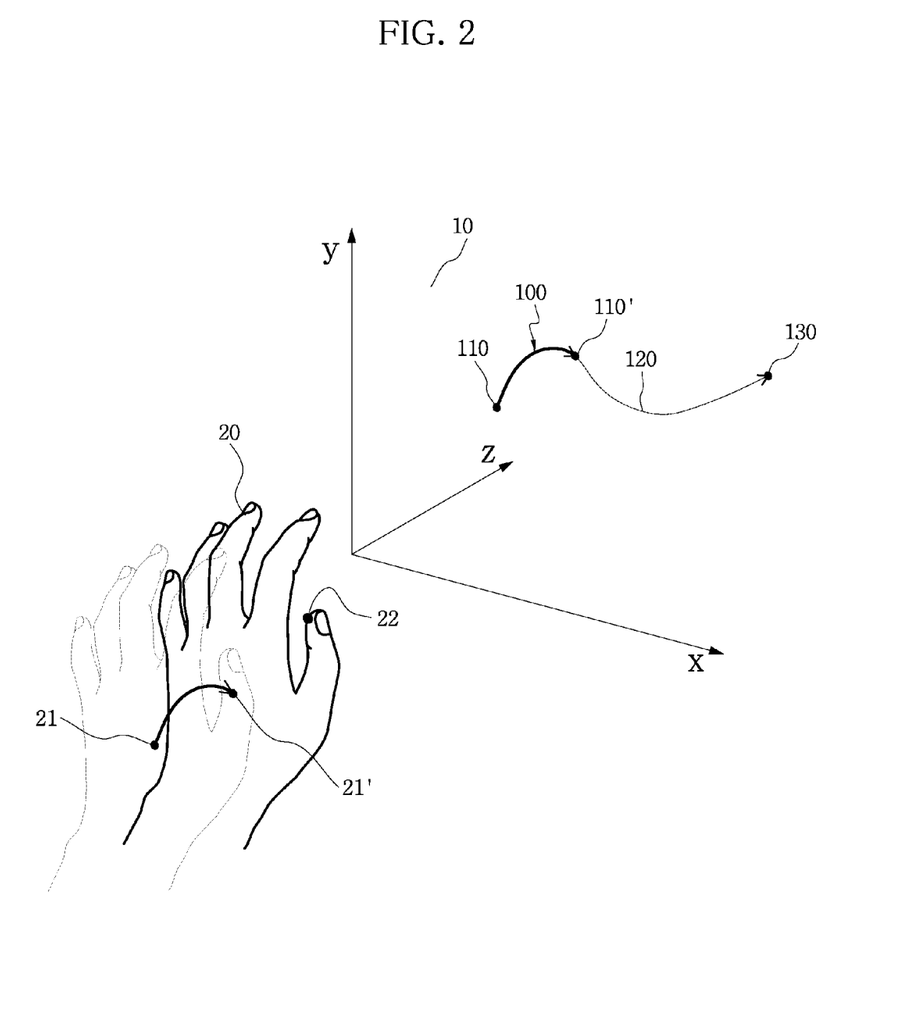

FIGS. 1 and 2 are diagrams showing a 3-dimensional user interface system according to an embodiment of the present disclosure.

The 3-dimensional user interface system of this embodiment includes an input device for collecting gesture inputs of a user, a computing device for processing the gesture inputs collected by the input device, a memory for storing a set of executive gestures for executing various functions, and an output device for displaying information processed by the computing device.

The input device of this embodiment may employ any device capable of collecting shape and motion information of an object, for example a depth camera capable of sensing a behavior status of an object by using distance information between the camera and the object or a motion glove directly worn on the hand of a person and sensing a motion of the hand.

The computing device serves as a central processing unit and calculates information and input signals received by the input device and outputs a 3-dimensional virtual space or various 3-dimensional graphics through the output device.

The memory stores programs for operating the system, various data and applications.

The output device outputs a 3-dimensional virtual space and gives a visible interface to the user. In the following embodiments, the output device is described as a monitor having a 2-dimensional screen, but it should be understood that a 3-dimensional display device for projecting 3-dimensional graphics by means of 3D display technologies may also be used in the present disclosure.

Referring to FIGS. 1 and 2, the hand 20 of the user is used for operating the interface system of this embodiment. Even though the hand 20 of the user is used for convenience, a tool such as a stylus may also be used.

A depth camera (not shown) is used as the input device for collecting gesture information of the hand 20. Here, the motion glove described above may also be suitably used as the input device of the present disclosure since it may measure movement of points located at the hand 20 of the user by calculating joint angles of the fingers in the hand of the user or the like.

In this embodiment, the monitor 10 having a 2-dimensional screen is used as the output device. A 3-dimensional virtual space expressed in x-axis, y-axis and z-axis is output through the monitor 10, and a 3-dimensional graphic giving a cubic effect to the user may be output to the virtual space. This is as well known in the art and not described in detail here.

Meanwhile, the memory stores a set of executive gestures for executing a plurality of functions which may be provided by the user interface system.

FIGS. 3A to 3D are diagrams showing a few executive gestures according to an embodiment of the present disclosure.

As shown in FIGS. 3A to 3D, the executive gestures of this embodiment are executive trajectories 200, 300, 400, 500 defined 3-dimensionally. The executive trajectories 200, 300, 400, 500 may be generally designed and stored in the memory in advance by a system designer, but in this embodiment, they are directly input and stored by the user or recommended by the system and then stored in the memory.

Each of the executive trajectories 200, 300, 400, 500 corresponds to an executive input of a specific function. For example, the executive trajectory 200 of FIG. 3A corresponds to an executive input for executing a "contents deleting" function. The executive trajectory 300 of FIG. 3B corresponds to an executive input for executing a "contents copying" function. And, the executive trajectory 400 of FIG. 3C corresponds to an executive input for executing a "contents pasting" function. In addition, the executive trajectory 500 of FIG. 3D corresponds to an executive input for executing a "device locking" function.

In this embodiment, if a trajectory of a gesture input by the user completes one of the executive trajectories, a function corresponding to the trajectory is executed.

Hereinafter, this will be described in more detail with reference to FIGS. 1 and 2.

As shown in FIG. 1, if the user locates the hand 20 at the front of the depth camera (not shown) installed at the monitor 10, the depth camera detects a location of one point 21 on the hand of the user and matches the point 21 on the hand with a point 110 in a 3-dimensional virtual space on the screen. At this time, in order to visually show the location of the point 110 to the user, a cursor may be displayed on the screen.

After that, as shown in FIG. 2, in order to perform a function according to the trajectory of a gesture, the user first makes a hand shape which indicates a start point of the trajectory. For example, a motion of attaching the thumb 22 to the palm may be used for this. If the depth camera traces a location of the thumb 22 and detects the motion of attaching the thumb 22 to the palm, the computing device recognizes this motion as an input for fixing a start point and fixes the point 110 corresponding to one point 21 on the hand as a start point of the trajectory.

If the user makes a gesture of moving the hand 20 and moves the point 21 on the hand to a point 21', the depth camera detects the motion, and the computing device calculates a trajectory of a gesture 100 connected from the point 110 to a point 110' corresponding to the present location 21' of the hand.

At this time, the computing device compares the trajectory of a gesture 100 according to the hand motion of the user with executive trajectories 200, 300, 400, 500 stored in the memory.

If the trajectory of a gesture 100 completes a trajectory substantially identical to the executive trajectory 200 (FIG. 3A) for performing a "contents deleting function" as shown in FIG. 2, the contents deleting function is performed.

The user interface system of this embodiment has a function of storing an executive gesture changed by the user and, if desired, recommending an executive gesture to the user.

Figure 3A:
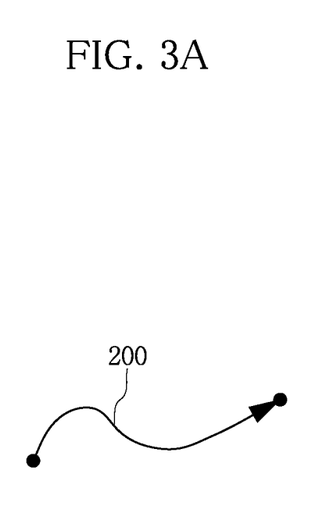
FIGS. 3A to 3D are diagrams showing a plurality of executive gestures according to an embodiment of the present disclosure.
Figure 3B:
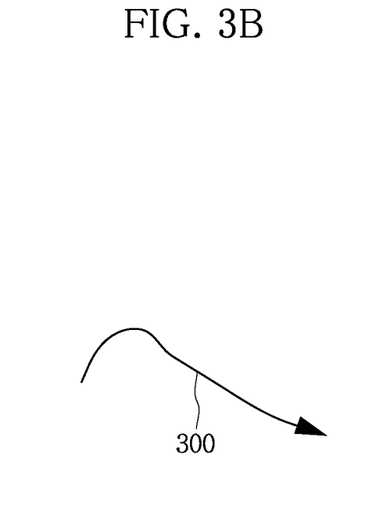
Figure 3C:
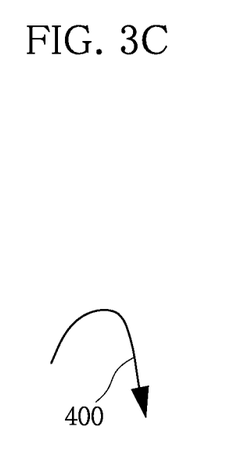
Figure 3D:
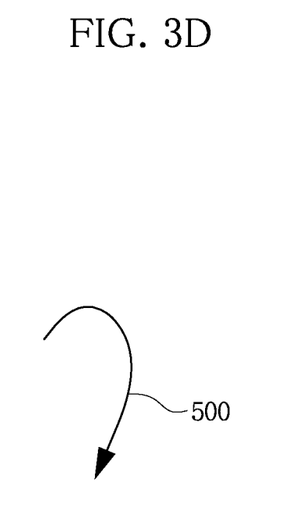
Figure 4:
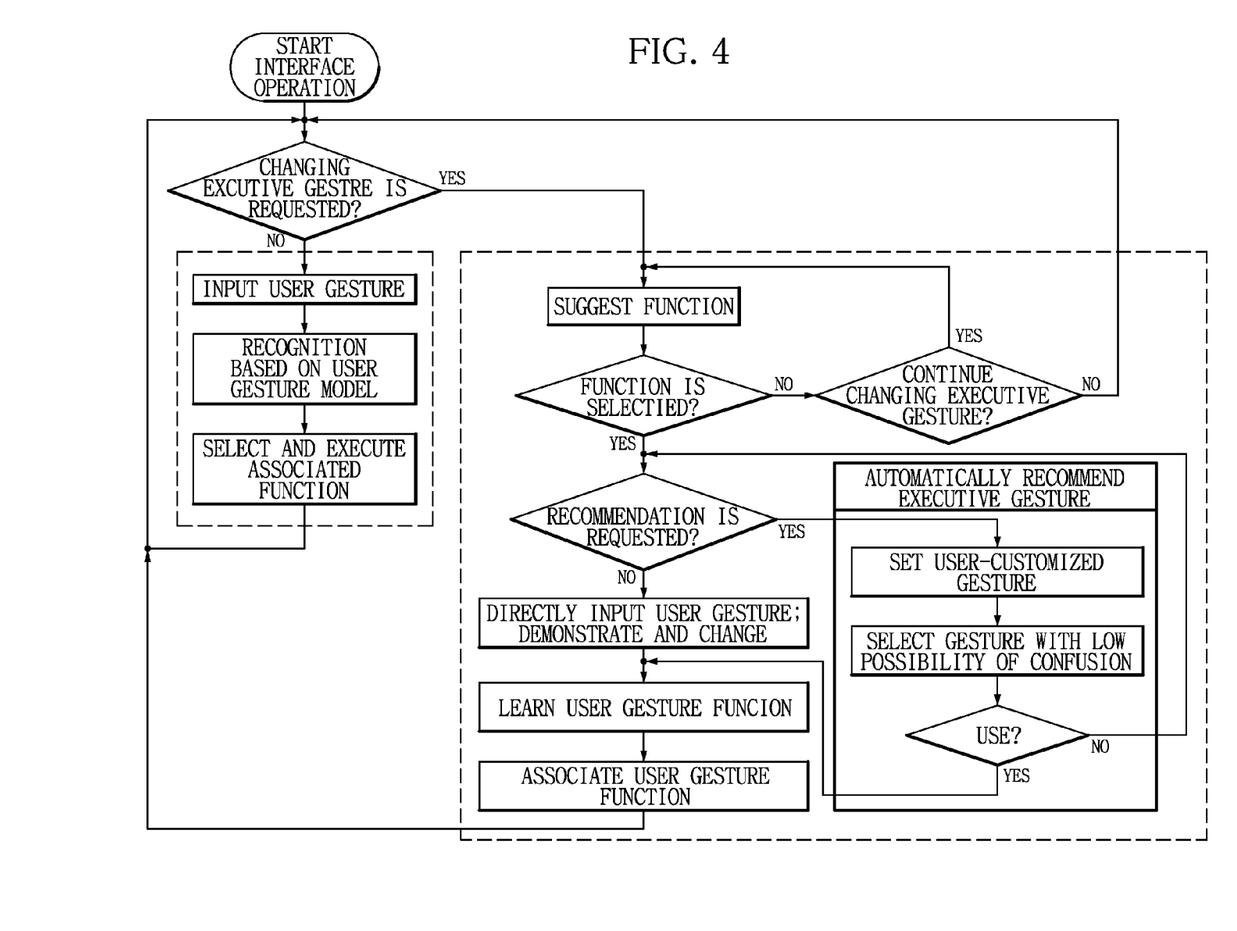
FIG. 4 is a flowchart for illustrating operations of the user interface system according to an embodiment of the present disclosure.

FIG. 4 is a flowchart for illustrating operations of a user interface system according to an embodiment of the present disclosure. For example, the case of changing the executive trajectory 300, which is an executive gesture for performing a "contents copying" function in FIG. 3B, will be described.

As shown in FIG. 4, the computing device determines whether the user requests to change an executive gesture by selecting an executive gesture change menu.

If there is no request for changing an executive gesture, a user gesture input (an input of a trajectory of a gesture) is analyzed and its associated function is selected and performed.

If there is a request for changing an executive gesture, the computing device suggests a function list possessed by the system through an output device. If the user selects a "contents copying" function in the list, the computing device inquires whether or not to recommend an executive gesture for performing the "contents copying" function.

If the user rejects the recommendation, the computing device gives an opportunity for the user to directly input an executive gesture for the selected "contents copying" function. The input of an executive gesture by the user will be described below with reference to FIG. 2. The user may generate a new executive trajectory by locating the hand at the front of the depth camera, designating a start point of a desired executive trajectory by taking a motion of attaching the thumb 22 to the palm, forming a path of the executive trajectory by moving the hand, and designating an end point of the executive trajectory by taking a motion of detaching the thumb 22 from the palm.

The computing device stores the executive trajectory newly generated by the user in the memory as an executive gesture for performing a "contents copying" function.

Meanwhile, if the user decides to accept recommendation, the interface system of this embodiment automatically generates a new executive gesture customized for the user and recommends the generated executive gesture to the user. At this time, the generated executive gesture is automatically selected to minimize the possibility of confusion of the user.

Figure 5A:
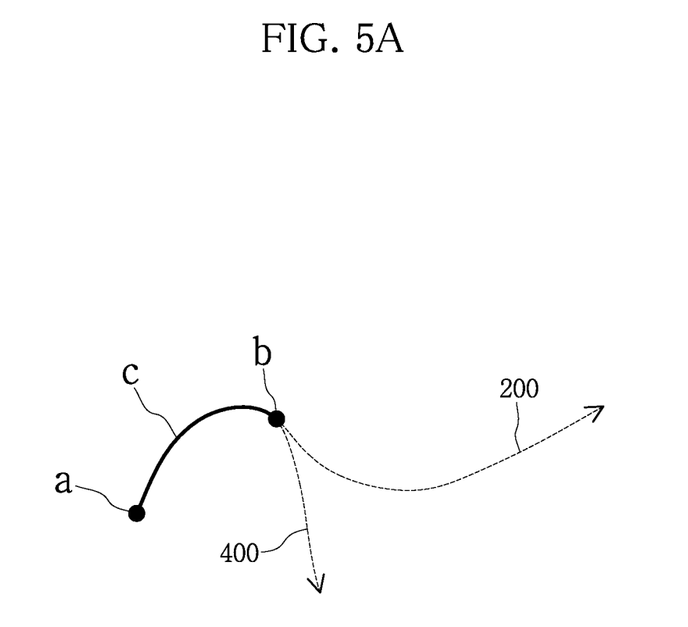
FIGS. 5A and 5B are diagrams for illustrating a method of automatically generating an executive gesture according to an embodiment of the present disclosure.
Figure 5B:
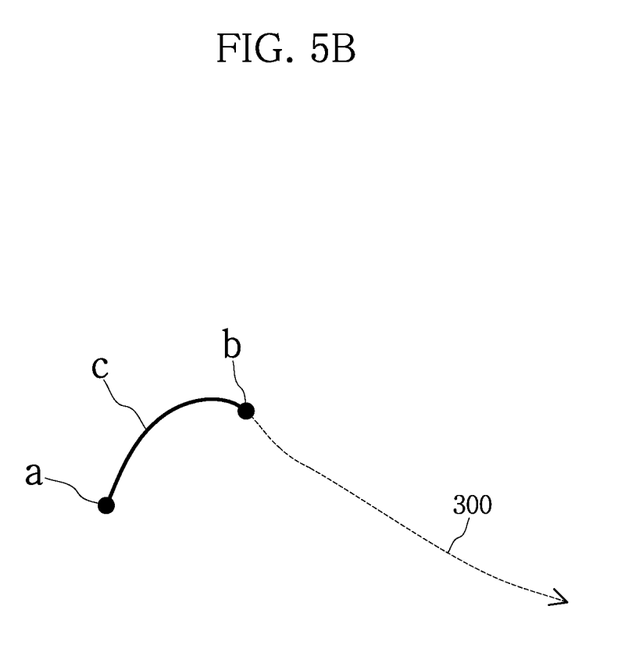

FIGS. 5A and 5B are diagrams for illustrating the principle of generating a customized executive gesture according to an embodiment of the present disclosure.

It is assumed that an executive gesture for performing a "contents copying" function, which has a different gesture from the executive trajectory 300 of FIG. 3B, is stored in the memory.

If the user desires recommendation for an executive gesture for performing the "contents copying" function, the computing device extracts executive gestures of functions similar to the "contents copying" function, namely contents processing functions, and compares them. In FIGS. 3A to 3D, the executive gestures relating to contents processing are the executive trajectory 200 relating to "contents deleting" and the trajectory 400 relating to "contents pasting".

The computing device compares the executive trajectories 200, 400 and extracts common features and different features as shown in FIG. 5A.

As shown in FIG. 5A, the executive trajectories 200, 400 have a common path (c) starting from a start point (a) and quitting at an end point (b), and have entirely different paths therefrom.

Therefore, as shown in FIG. 5B, when the user performs a function relating to contents processing, the computing device determines that the path (c) is preferred and uses the path (c) in a newly generated executive gesture of "contents copying" as a start path.

Meanwhile, in the path after the end point (b), since the executive trajectory 200 moves upwards and the executive trajectory 400 moves downwards, in order to minimize the possibility of confusion of the user, the computing device generates a remaining trajectory of the executive trajectory 300 of "contents copying" by using an intermediate path between the upward path of the executive trajectory 200 and the downward path of the executive trajectory 400.

Accordingly, the user may easily memorize the executive trajectory 300 as an executive gesture relating to contents processing without being confused with other contents processing executive gestures.

The computing device inquires whether the automatically generated executive trajectory 300 is acceptable for the user, and if the user inputs that it is acceptable, the computing device links the corresponding executive trajectory 300 to a new executive gesture for performing the "contents copying" function and stores in the memory.

Meanwhile, according to another embodiment of the present disclosure, the computing device generates a new executive gesture by comparing similarities with other executive gestures for performing functions other than the function (here, the "contents copying" function) selected by the user.

Referring to FIGS. 3A to 3D again, if the user desires to change the executive gesture 300 relating to "contents copying" through recommendation, the computing device arbitrarily generates a new trajectory and checks similarities with the executive trajectories 200, 400, 500.

In order to check similarity of two trajectories with curved shapes, start points of both trajectories to be compared are matched, and then distances between points of both trajectories are calculated and a percentage of points not greater than a predetermined distance level is calculated. In addition, other similarity checking methods known in the art may also be used, without being limited to the above.

In this embodiment, by means of the similarity checking as described above, when an arbitrarily generated trajectory is compared with three executive trajectories 200, 400, 500, if the similarity is not greater than, for example, 70% for all trajectories, it is determined that the possibility of confusion of the user is low, and then the generated trajectory is exhibited to the user and inquires whether the trajectory is acceptable. Even though the criterion for determining similarity is 70%, it should be understood that the criterion may be raised or lowered depending on the performance and environments of the system.

As described above, according to the embodiments of the present disclosure, a user may change an executive gesture for performing a function, and in order to change an executive gesture, the executive gesture may be directly demonstrated by the user or automatically generated and recommended by the system.

In this configuration, an executive gesture for a function may be changed in various ways according to the preference of the user, and the burden on the user to directly designate executive gestures one by one may be lessened since executive gestures may be recommended by the system.

Even though it has been described that the interface system according to this embodiment is a 3-dimensional interface system, it should be understood that the present disclosure may also be applied to a 2-dimensional interface system, without being limited to the above. For example, a touch screen for receiving gesture information by a touch of a user and outputting various kinds of information may also be used as an input and output device of the system. In this case, executive trajectories serving as executive gestures are 2-dimensional trajectories, and if a user touches the touch screen and then moves the finger to draw a gesture so that the gesture completes one of the executive trajectories, the corresponding function is executed.

In addition, in a 2-dimensional interface system, it should be understood that the executive gesture is not limited to a trajectory form.

For example, if the user defines that "contents copying" is executed by a single tapping gesture and "contents deleting" is executed by twice tapping gestures, the computing device may recommend triple tapping gestures, similar to the above gestures, to the user as an execute gesture for "contents pasting".

While the exemplary embodiments have been described, it will be understood by those skilled in the art that various changes in form and details may be made thereto without departing from the spirit and scope of the present disclosure as defined by the appended claims.

What is claimed is:

1. A user interface system, comprising:
    an input device for collecting gesture inputs of a user;
    a computing device for processing the gesture inputs collected by the input device;
    a memory for storing a set of executive gestures for executing various functions; and
    an output device for displaying information processed by the computing device, wherein:
    each executive gesture of the executive gestures corresponds to a gesture input for a function, and in response to the gesture input being performed by the user corresponding to an executive gesture, the corresponding function is executed, in response to a request for changing the executive gesture, the computing device suggests a function list, in response to a function being selected from the function list, a new executive gesture for executing the selected function is automatically generated, and the new executive gesture is stored for executing the selected function, wherein the new executive gesture is generated based on an intermediate path between an upward path of an executive gesture for executing a function similar to the function selectable by the user and a downward path of an executive gesture for executing a second function similar to the function selectable by the user.

2. The user interface system of claim 1, wherein the new executive gesture is provided based on a demonstration of the executive gesture by the user.

3. The user interface system of claim 1, wherein the new executive gesture is generated based on executive gestures for executing functions similar to the function selectable by the user.

4. The user interface system of claim 1, wherein the new executive gesture is generated based on the similarities with executive gestures for executing functions other than the function selected by the user.

5. The user interface system of claim 1, wherein the new executive gesture is generated based on similarities in executive gestures for executing functions similar to the function selectable by the user.

6. The user interface system of claim 1, wherein the new executive gesture is generated based on differences in executive gestures for executing functions similar to the function selectable by the user.

7. The user interface system of claim 1, wherein the new executive gesture is generated based on similarities and differences in executive gestures for executing functions similar to the function selectable by the user.

8. The user interface system of claim 1, wherein the new executive gesture is generated based on an intermediate of the differences between executive gestures for executing functions similar to the function selectable by the user.

9. The user interface system of claim 1, wherein, in response to a first executive gesture for executing a function similar to the function selectable by the user comprising a first length along a major axis longer than a second length of a second executive gesture for executing a second function similar to the function selectable by the user, the new executive gesture comprising a length along the major axis longer than the first length is generated.

10. The user interface system of claim 1, wherein, in response to a first executive gesture for executing a function similar to the function selectable by the user comprising a first length along a major axis longer than a second length of a second executive gesture for executing a second function similar to the function selectable by the user, the new executive gesture comprising a length along the major axis closer to the second length than the first length is generated.

11. The user interface system of claim 1, wherein, in response to a first executive gesture for executing a function similar to the function selectable by the user comprising a first length along a major axis longer than a second length of a second executive gesture for executing a second function similar to the function selectable by the user, the new executive gesture comprising a portion extending beyond the first executive gesture is generated, wherein the portion is different from a corresponding portion of the second executive gesture.

12. The user interface system of claim 1, wherein, in response to a first executive gesture for executing a function similar to the function selectable by the user comprising a first length along a major axis different from a second length of a second executive gesture for executing a second function similar to the function selectable by the user, the new executive gesture comprising a length along the major axis closer to the first length than the second length is generated.

13. The user interface system of claim 1, wherein in response to the computing device suggesting the function list, the computing device inquires whether or not to recommend an executive gesture for performing a function.

14. A user interface implementing method comprising:
collecting gesture inputs of a user at an input device;
processing the gesture inputs collected by the input device at a computing device;
storing a set of executive gestures for executing various functions;
displaying information processed by the computing device, wherein each executive gesture of the executive gestures corresponds to a gesture input for a function, and in response to the gesture input being performed by the user corresponding to an executive gesture, the corresponding function is executed;
determining whether a request for changing the executive gesture is received at the computing device;
providing a list of selectable functions, in response to receiving the request for changing the executive gesture;
generating automatically a new executive gesture for executing the function selected by the user, in response to a function being selected from the function list; and
storing the new executive gesture for executing the selected function, wherein the new executive gesture is generated based on an intermediate path between an upward path of an executive gesture for executing a function similar to the function selectable by the user and a downward path of an executive gesture for executing a second function similar to the function selectable by the user.

15. The user interface implementing method of claim 14, wherein the generating automatically of the new executive gesture comprises generating the new executive gesture based on receiving a gesture at the input device.

* * * * *